Figure 3:
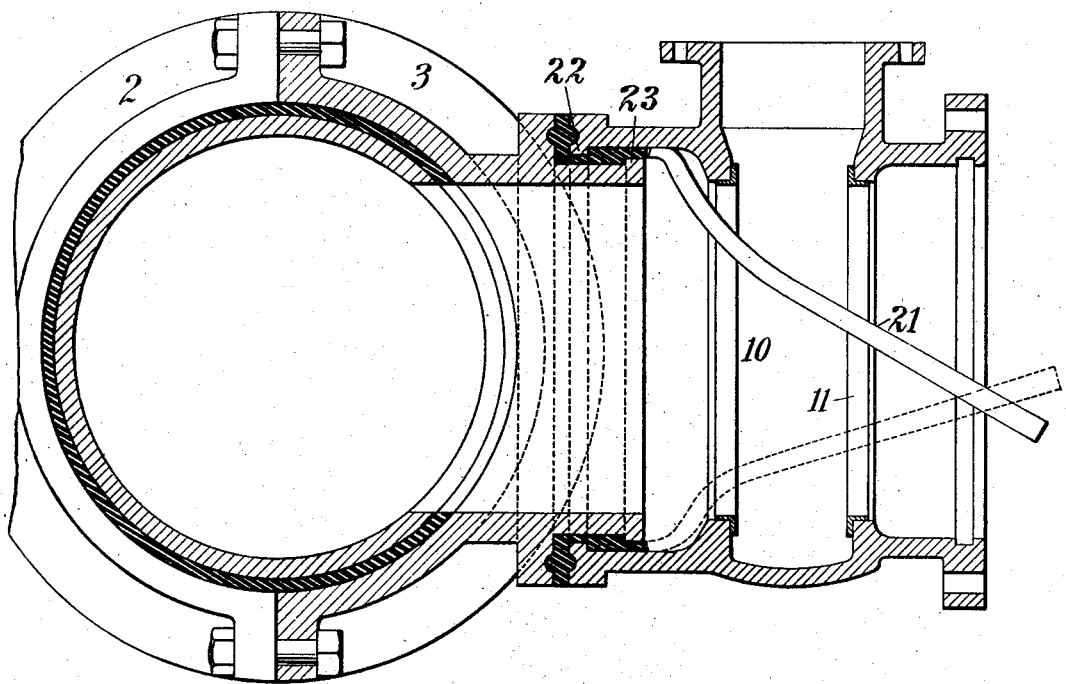

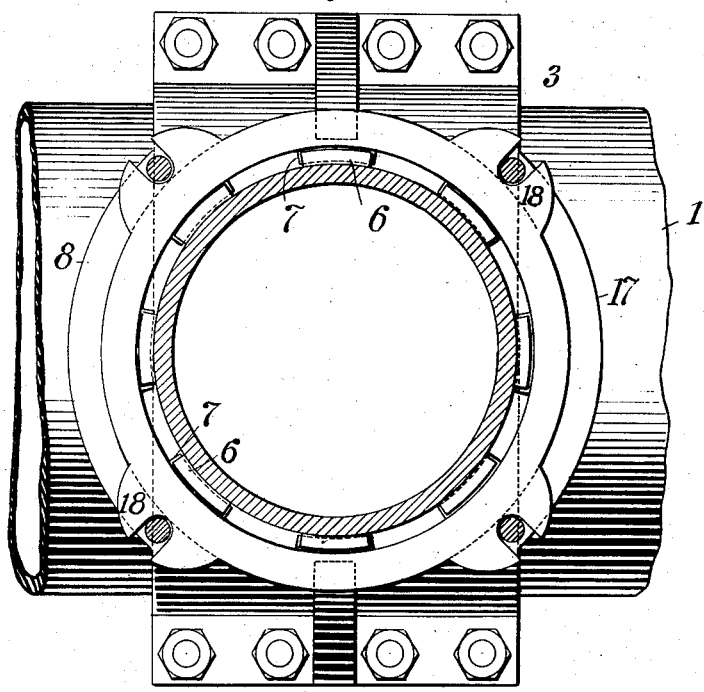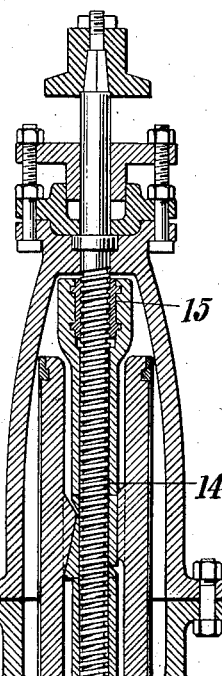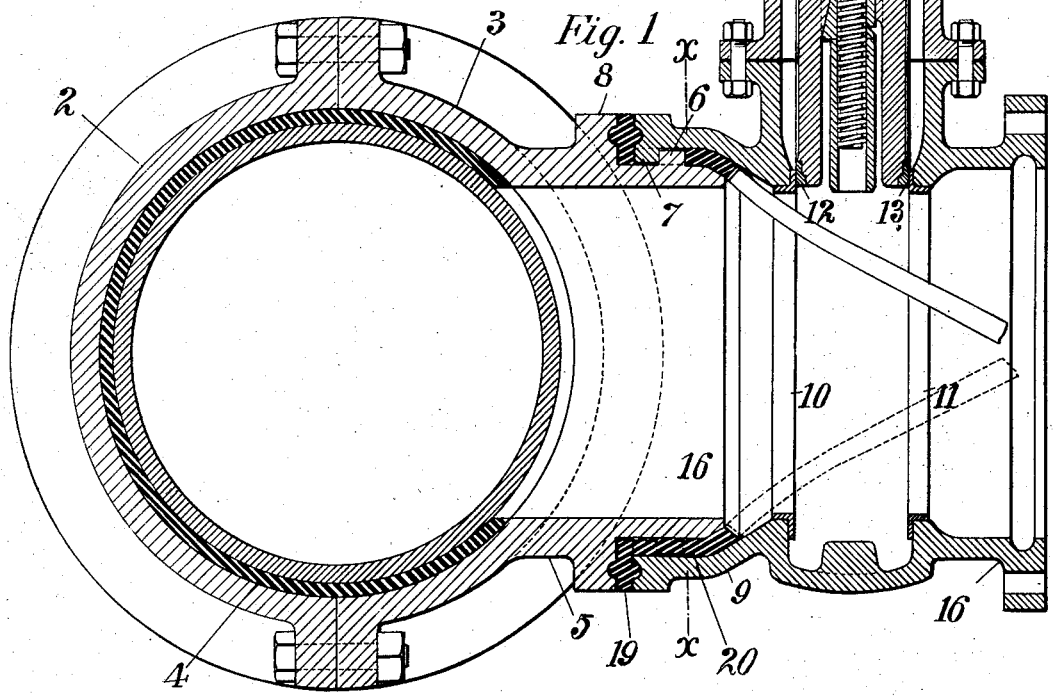

No. 850,915. PATENTED APR. 23, 1907.
P. ELEY.
CONNECTION FOR TAPPING MAINS.
APPLICATION FILED MAY 6, 1904.

2 SHEETS—SHEET 2.

Witnesses:
Raphael Petter
DS Dunham

Philip Eley   Inventor by Kerr, Page & Cooper Attys.

UNITED STATES PATENT OFFICE.

PHILIP ELEY, OF BAYONNE, NEW JERSEY.

CONNECTION FOR TAPPING MAINS.

No. 850,915. Specification of Letters Patent. Patented April 23, 1907.

Application filed May 6, 1904. Serial No. 206,617.

*To all whom it may concern:*

Be it known that I, PHILIP ELEY, a citizen of the United States, residing at Bayonne, in the county of Hudson and State of New Jersey, have invented certain new and useful Improvements in Connections for Tapping Pipe-Mains, of which the following is a specification, reference being had to the drawings accompanying and forming a part of the same.

My invention the subject of the present application is an improvement in the devices used for tappling pipe-lines, such as water or gas mains, and establishing branch connections therewith, and has for its object to simplify and reduce the cost of such connections and at the same time increase their effectiveness and ease of application.

As is well understood by those skilled in this art, it is frequently desirable to run branch lines of water or gas pipes from large mains, and as the provision of permanent branch connections in advance would be impracticable it is necessary to tap the main and connect therewith a branch without cutting off the water or gas. This has usually been accomplished by providing a sectional sleeve, which is applied to the main at the point to be tapped. One of the sections of this sleeve is formed or provided with a hub or bell member of a coupling, into which is fitted and calked the spigot end of a valve. A suitable tapping-machine is then secured to the opposite end of the valve, and the gate being opened a circular disk is cut out from the main by a cutting-tool which extends through the valve and the hub member of the coupling. When the tap has been accomplished, the cutting-tool is withdrawn, the valve-gate closed, and the tapping-machine removed. This leaves a branch connection to which the branch pipe or main may be connected; but the practice in this respect of employing a sleeve with a hub member to enable the joint between the latter and the valve to be calked involves the use of a very long and expensive coupling and much labor in perfecting the joint. These objections I have entirely overcome by my improvement, which, stated in general terms, consists of the following devices: I employ a sectional sleeve which I apply to the main in the usual way; but one section of such sleeve I form or provide with a short spigot member of a coupling formed with a flange or abutment. In connection with this spigot member I use a valve with a hub or bell end which is fitted over the former and retained in place either by bolts passing through the flanges of the two members or by some convenient form of bayonet-joint, or both, in such manner that the joint between the two members may be thoroughly calked.

The peculiar and essential feature of my improvement, however, in addition to those described, is that I provide for the calking of the joint between the two members from the inside as well as the outside of the branch, so that the valve may be placed very close to the main, and a very short coupling member on the sleeve may be used. This improvement may be carried out in various specific ways, some of which in illustration of the principle I have illustrated in the accompanying drawings.

Figure 4:
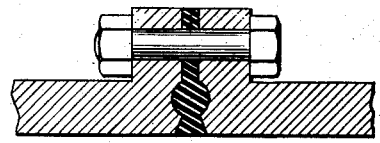

Figure 1 is a sectional view of the connection-sleeve and gate-valve at right angles to the main. Fig. 2 is a section on line *x x* of Fig. 1. Fig. 3 is a view similar to Fig. 1, illustrating a modified form of connection, and Fig. 4 is a sectional detail of a further modification.

The pipe or main with which a branch connection is to be established is illustrated by 1. Around this I place a sleeve, preferably composed of two parts 2 and 3, bolted together. The joint between the sleeve and the main is suitably calked with a lead or other packing 4.

The section 3 of the sleeve is formed or provided with a short extension 5, formed as the spigot member of a pipe-coupling, but provided with a circular abutment or flange 8. Over this spigot end is fitted the hub end of a valve-gate 9, which may be locked to the spigot member in any desired manner. For example, the spigot member may be provided with lugs or flanges 17, as shown in Fig. 2, and the hub member with ears or lugs 18, so that the two members may be positively locked by means of bolts.

As an alternative arrangement the spigot member may be provided with lugs 6 and the hub member with corresponding and inwardly-projecting lugs 7, which register with the spaces between the lugs 6 when the gate-valve is applied, but which engage with the latter when the valve is inserted and then turned. This form of lock is typical of an ordinary bayonet-joint.

When the gate-valve has been placed in position over the spigot member of the sleeve, the joint between the flanges of the two members is calked with a packing 19. The lead is also run into the space between the spigot and hub ends, as at 20, and calked by any suitable tool introduced through the open gate-valve. To facilitate this operation, the spigot end of the sleeve-coupling is tapered or beveled and the hub end of the valve similarly formed, so that any ordinary tool may be inserted through the open valve-gate for calking the joint. This special provision, however, is not essential, as a straight spigot and hub coupling may be used, as shown in Fig. 3, in which case a special tool 21 for calking the joint from the inside is most conveniently employed. Fig. 3 also illustrates a modification in the means for locking the two members to the coupling and is shown as consisting of lugs 22 and 23 on the two members, respectively, which do not engage or lock directly, but provide abutments at different points or opposite sides of the lead packing and so accomplish the same result. The special advantage of this device is that it permits the joint between the two members of the coupling to be calked from the inside as well as from the outside, thus securing an absolutely tight joint, while at the same time it enables me to use very short couplings, which may be calked without difficulty. This special advantage may be secured, though not to the same degree, by the form of coupling shown in Fig. 4, in which both members of the coupling are provided with flanges which are secured together by bolts and calked with a lead packing which may be tamped from both the inside and outside of the pipe.

In Fig. 1 I have illustrated the details of the valve-gate which I preferably use, although this forms no part of my present invention. It is shown as consisting of a case 9, provided with seats 10 11, against which are seated gates 12 13. The latter are operated in the well-known way, as by means of a screw 14, suitably journaled in the cover or bonnet 15. The end 16 of the case is adapted for connection with a length of pipe and may be formed in any desired manner.

It is understood that after the sleeve has been secured to the main and the valve-casing joined to the sleeve a tapping-machine is secured to the outer end of the valve-casing, the valve-gate raised, and the tap is then made by the tool entering the spigot end of the sleeve connection. When this operation is completed, the tool is withdrawn and the valve-gate closed, when the tapping-machine may be removed and a branch pipe connected to the valve-casing.

Having now described my invention, what I claim is—

1. The combination with a main or pipe, of a sleeve surrounding the same, a spigot member extending from the sleeve and provided with an outside flange or abutment at a point removed from the edge of the spigot member, a valve-casing having a hub member fitting over the spigot, and a packing between the said two members accessible for calking from inside and outside the coupling, as set forth.

2. The combination with a main or pipe, of a sleeve surrounding the same, a spigot extension from the sleeve having a circular abutment or flange on the outside thereof and a tapered end beyond the same, a valve-casing having a hub end and an internal surface corresponding to the tapered end of the spigot, and a packing between the tapered surface of the two members, as set forth.

3. The combination with a sectional sleeve adapted to surround a pipe or main and provided with a spigot member having a tapered end, and a flange or abutment on the outside of the spigot member, of a valve-casing with a hub end fitting over the spigot end and having a similarly-inclined surface, lugs on both of said members adapted to engage and lock the same together in assembled position, and a packing between the two members, as set forth.

4. The combination with a sleeve adapted to surround a pipe or main and provided with a spigot member formed with a circular abutment or flange on the outside thereof, a valve-casing having a hub end with a flange thereon and adapted to fit over the spigot member, and a packing between the abutting flanges and the spigot and hub members of the coupling, and adapted to be calked from both the inside and outside of the coupling, as set forth.

PHILIP ELEY.

Witnesses:
M. LAWSON DYER,
S. S. DUNHAM.